US 6,744,626 B2

(12) United States Patent
Chen et al.

(10) Patent No.: US 6,744,626 B2
(45) Date of Patent: Jun. 1, 2004

(54) MOUNTING APPARATUS FOR DISK DRIVE DEVICES

(75) Inventors: Yun-Lung Chen, Tu-chen (TW); Kuo-Chih Lin, Tu-chen (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 11 days.

(21) Appl. No.: 10/291,083

(22) Filed: Nov. 8, 2002

(65) Prior Publication Data
US 2004/0032712 A1 Feb. 19, 2004

(30) Foreign Application Priority Data
Aug. 13, 2002 (TW) .................................. 91212545 U

(51) Int. Cl.[7] ................................................ G06F 1/16
(52) U.S. Cl. ...................... 361/685; 361/679; 361/683; 211/26; 211/41; 312/223.2; 248/694
(58) Field of Search ................. 361/683, 679, 361/685, 724–727, 730–732, 735; 312/223.1, 223.2, 218, 333, 330.1, 216, 332.1, 251.1; 248/60, 581, 609, 611, 346.03, 346.04, 500, 209, 220.22, 240, 291.1; 211/26, 41

(56) References Cited

U.S. PATENT DOCUMENTS

| 5,584,396 A | * | 12/1996 | Schmitt | 211/26 |
| 5,995,363 A | * | 11/1999 | Wu | 361/679 |
| 6,386,656 B1 | * | 5/2002 | Chen | 312/223.2 |
| 6,530,551 B2 | * | 3/2003 | Gan | 248/694 |
| 6,538,879 B2 | * | 3/2003 | Jiang | 361/683 |
| 6,646,872 B1 | * | 11/2003 | Chen | 361/685 |
| 2003/0202322 A1 | * | 10/2003 | Chen | 361/685 |

* cited by examiner

Primary Examiner—Michael Datskovsky
(74) Attorney, Agent, or Firm—Wei Te Chung

(57) ABSTRACT

A mounting apparatus for disk drive devices includes a first bracket (10), a crank (20), and a second bracket (30). The first bracket has a mounting wall (12). A pivot (124) is formed on an outer face of the mounting wall. The crank is pivotably attached to the first bracket. The crank defines a pivot hole (242) pivotably receiving the pivot of the mounting wall of the first bracket, and also has a protrusion (244). The second bracket is secured to the mounting wall of the first bracket. The second bracket has a top wall (32). A sliding slot (324) is defined in the top wall. When the crank is rotated, the protrusion of the crank slides along the sliding slot and pushes the second bracket until the second bracket is attached to the first bracket.

16 Claims, 5 Drawing Sheets

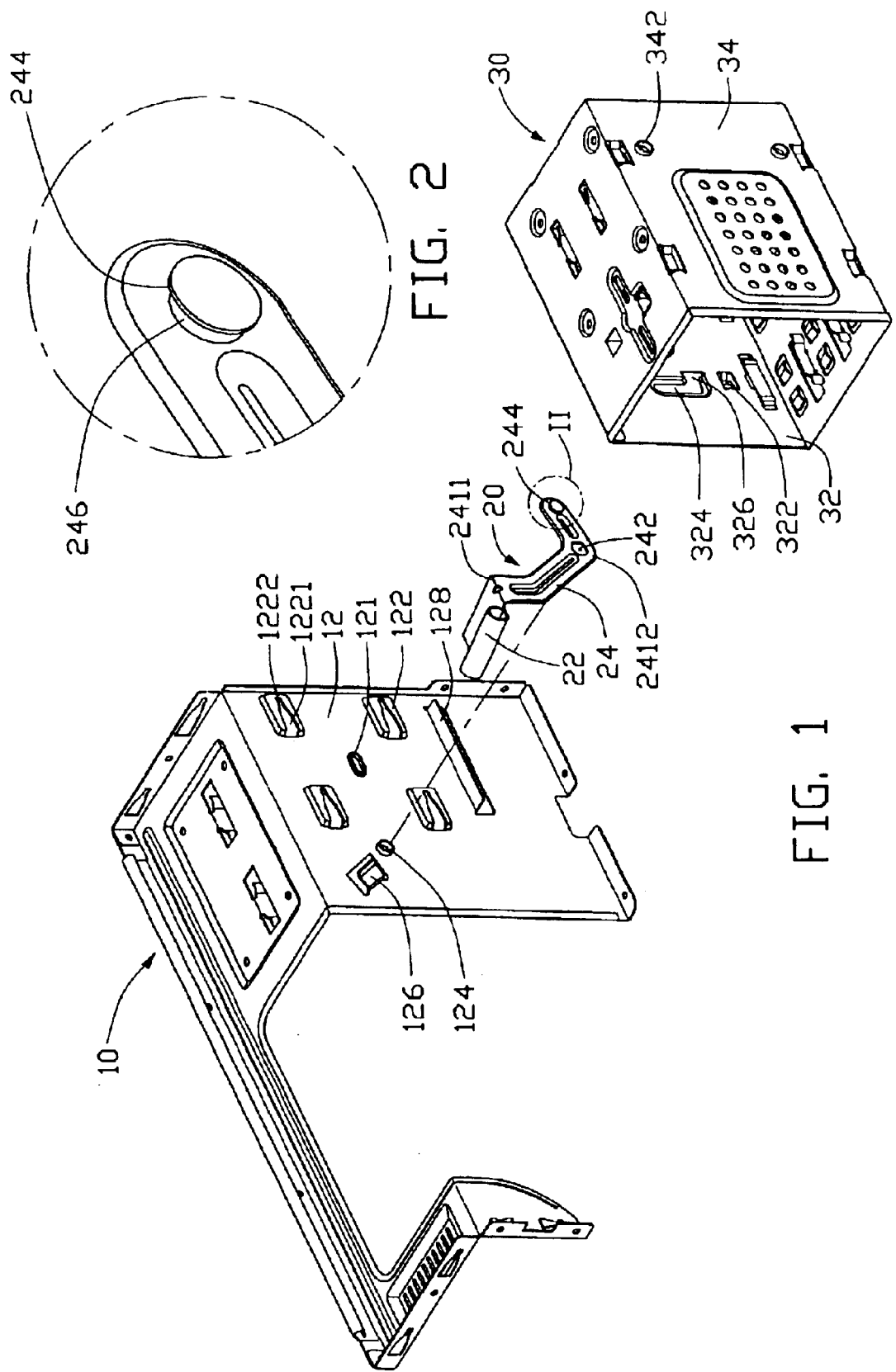

2

MOUNTING APPARATUS FOR DISK DRIVE DEVICES

BACKGROUND OF THE INVENTION

1. Field of the Invention

The present invention relates to mounting apparatuses, and particularly to a mounting apparatus for mounting disk drive devices to computer enclosures.

2. Description of Related Art

In the enclosure of a typical personal computer, there are generally two disk drive brackets mounted therein. Usually, a variety of disk drives are received in the disk drive brackets, which are then secured into the enclosure. There are many ways to secure the disk drive brackets in the enclosure. One way is by using screws. A pair of joining edges is formed on opposite sides of a bottom of a lower disk drive bracket. Fixing holes are defined in the joining edges. The lower disk drive bracket is secured to a bottom of an upper disk drive bracket by screws. However, this way of securing the disk drive brackets is unduly painstaking and time-consuming. Disassembly of the disk drive brackets is similarly painstaking and time-consuming.

Another way to secure the disk drive brackets in the enclosure is by using hooks. An example of a pertinent mounting apparatus for disk drive devices is disclosed in Taiwan patent application no. 81205427. One side of a first disk drive bracket has a plurality of L-shaped flanges and a plurality of L-shaped projections. A corresponding side of a second disk drive bracket has a plurality of L-shaped projections and a plurality of L-shaped flanges, respectively corresponding to the L-shaped flanges and L-shaped projections of the first disk drive bracket. Each flange fastens to the corresponding projection, thus securing the second disk drive bracket to the first disk drive bracket. This mounting apparatus does not need screws. However, the disk drive brackets must be assembled by hand inside the computer enclosure. Thus makes the assembly operation inconvenient, and increases the risk of accidental damage to other components such as sensitive electronic components inside the computer enclosure.

An improved mounting apparatus for disk drive devices which overcomes the above-mentioned problems is desired.

BRIEF SUMMARY OF THE INVENTION

Accordingly, an object of the present invention is to provide a mounting apparatus for conveniently mounting disk drive devices to a computer enclosure.

To achieve the above-mentioned objects, a mounting apparatus for disk drive devices of the present invention comprises a first bracket, a crank and a second bracket. The first bracket has a mounting wall. A pivot is formed on an outer face of the mounting wall. The crank is pivotably attached to the first bracket. The crank defines a pivot hole pivotably receiving the pivot of the mounting wall of the first bracket, and also has a protrusion. The second bracket is secured to the mounting wall of the first bracket. The second bracket has a top wall. A sliding slot is defined in the top wall. When the crank is rotated, the protrusion of the crank slides along the sliding slot and pushes the second bracket until the second bracket is attached to the first bracket.

Other objects, advantages and novel features of the present invention will be drawn from the following detailed description of a preferred embodiment of the present invention with the attached drawings, in which:

BRIEF DESCRIPTION OF THE DRAWINGS

FIG. 1 is an exploded isometric view of a mounting apparatus for disk drive devices in accordance with the preferred embodiment of the present invention;

FIG. 2 is an enlarged view of an encircled portion II of FIG. 1;

DETAILED DESCRIPTION OF THE INVENTION

Figure 3:
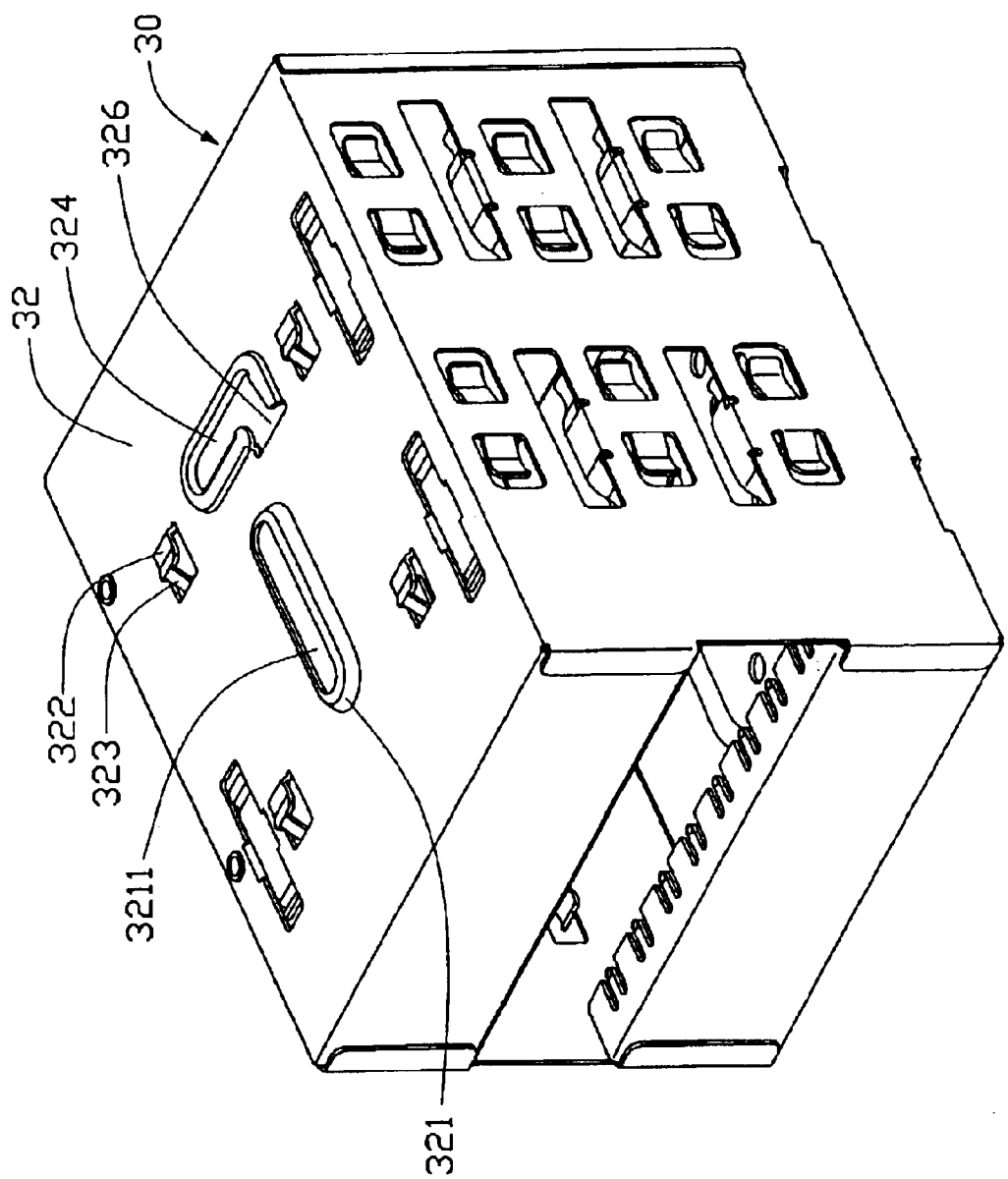
FIG. 3 is a perspective view of a second bracket of the mounting apparatus of FIG. 1, but viewed from another aspect.

Referring to FIGS. 1–3, a mounting apparatus for disk drive devices in accordance with a preferred embodiment of the present invention comprises a first bracket 10, a crank 20 and a second bracket 30.

The first bracket 10 has a mounting wall 12. A generally oval-shaped guiding portion 121 is formed on an outer face of the mounting wall 12. Four bulges 122 are formed on the outer face of the mounting wall 12, in a rectangular array surrounding the guiding portion 121. Each bulge 122 defines a locking slot 1221. An end of each locking slot 1221 comprises a narrow portion 1222. A pivot 124 is formed on the outer face of the mounting wall 12, outside the rectangular array of four bulges 122. An L-shaped blocking tab 126 is formed on the outer face of the mounting wall 12, outside the rectangular array of four bulges 122 and near the pivot 124. A support plate 128 extends perpendicularly outwardly from the mounting wall 12, outside the rectangular array of four bulges 122.

The crank 20 is formed from a single piece of plate material, and has a body 24 and a handle 22. The plate is bent perpendicularly at a second elbow 2411. The handle 22 is formed by rolling up a portion of the plate at one side of the second elbow 2411. A portion of the plate at an opposite side of the second elbow 2411 forms the body 24. Thus the body 24 is generally perpendicular to the handle 22. The body 24 comprises three straight sections. That is, two end sections oriented generally perpendicular to each other, and an intermediate section interconnecting the end sections and oriented at oblique angles to the end sections. A pivot hole 242 is defined in a first elbow 2412 of the body 24, corresponding to the pivot 124 of the first bracket 10. A protrusion 244 protrudes perpendicularly from an end of the body 24 that is distal from the handle 22. The protrusion 244 comprises a head (not labeled) and a narrowed neck 246.

The second bracket 30 has a top wall 32 and a bottom wall 34. A bulge 321 is outwardly formed on the top wall 32. The bulge 321 defines a guiding slot 3211, corresponding to the guiding portion 121 of the first bracket 10. Four engaging means 322 are outwardly formed on the top wall 32, in a rectangular array surrounding the guiding slot 3211. The engaging means 322 correspond to the locking slots 1221 of the first bracket 10. A fastener 323 is formed at one end of each engaging means 322, for engaging in a corresponding narrow portion 1222 of the first bracket 10. A sliding slot 324 is defined in the top wall 32 at one side of the guiding slot 3211 between two of the engaging means 322. The sliding slot 324 is generally perpendicular to the guiding slot 3211. The sliding slot 324 comprises an entrance 326, for allowing the protrusion 244 of the crank 20 to enter the sliding slot 324. A width of the entrance 326 is greater than a width of the sliding slot 3211. The width of the sliding slot 3211 is less than a diameter of the head of the protrusion 244 of the crank 20, but greater than a diameter of the neck 246 of the protrusion 244. The protrusion 244 is thereby prevented from escaping from the sliding slot 3211. A pair of positioning posts 342 extends outwardly from opposite sides of the bottom wall 34 respectively.

Figure 4:
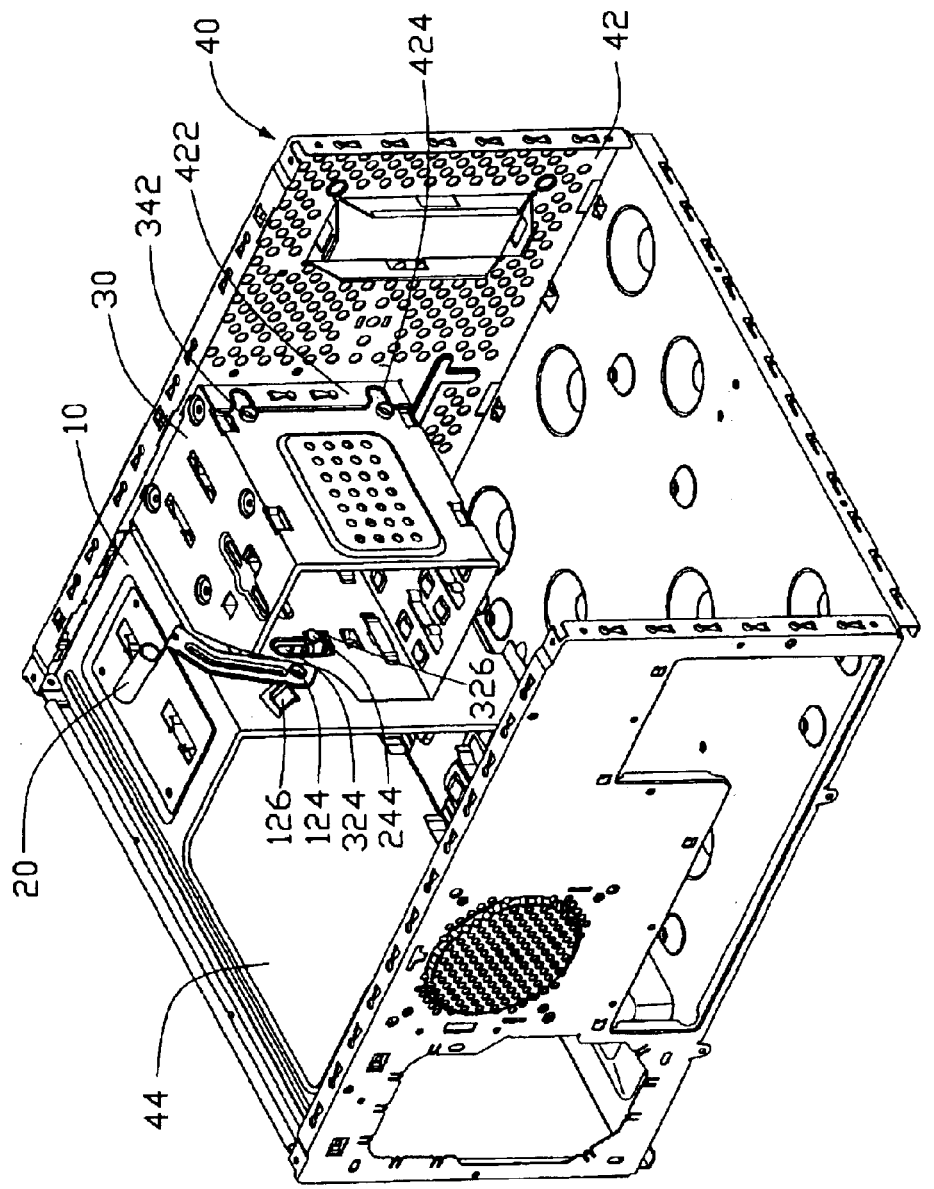
FIGS. 4–5 are isometric views showing two stages in a process of attaching the mounting apparatus of FIG. 1 to a computer enclosure.
Figure 5:
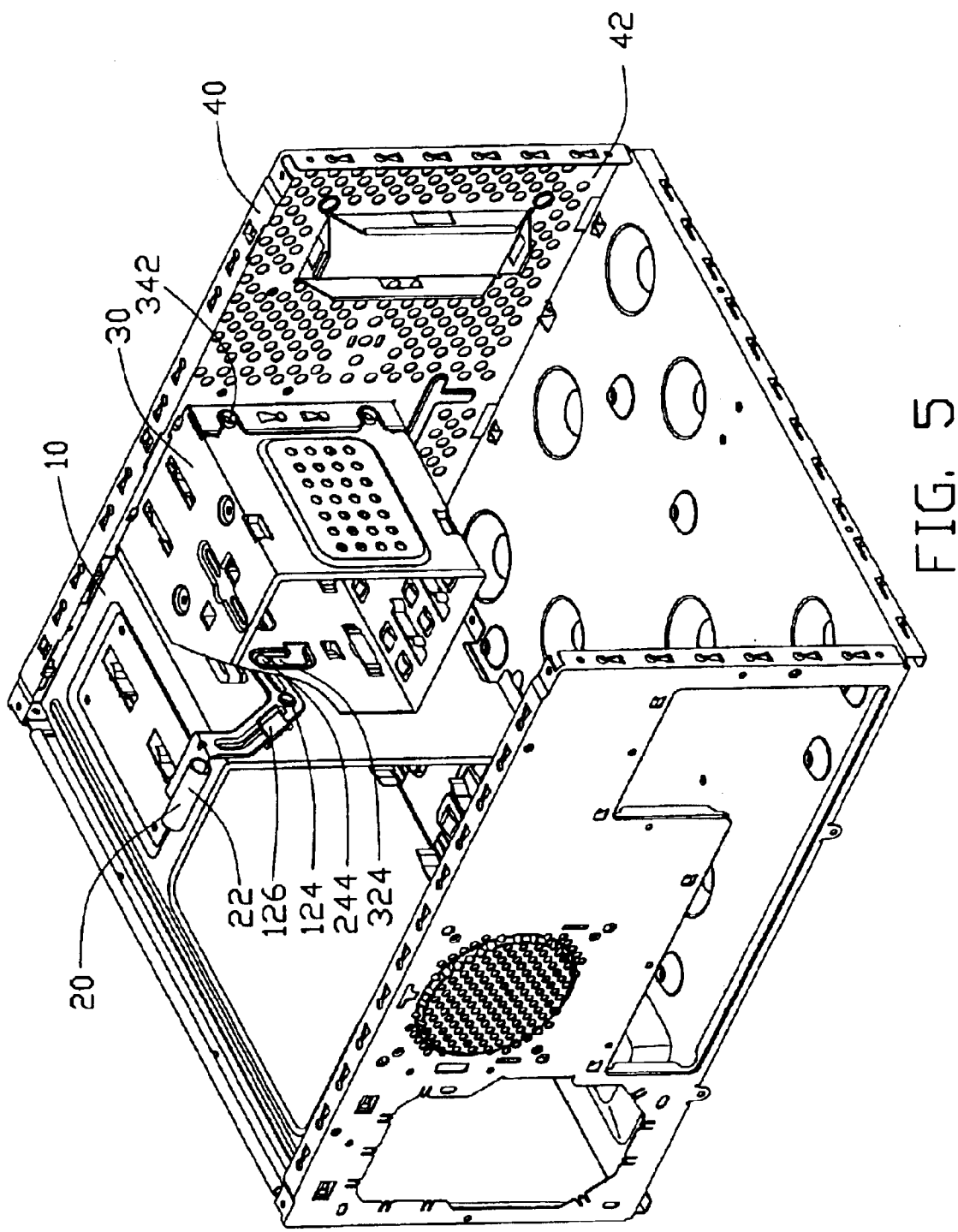

Referring also to FIGS. 4 and 5, the first bracket 10 is attached in a computer enclosure 40. The enclosure 40 includes a front panel 42 and a top panel 44. The first bracket 10 is secured to a bottom face of the top panel 44, with the mounting wall 12 of the first bracket 10 parallel to the top panel 44. A fixing flange 422 is bent perpendicularly inwardly from the front panel 42. Two spaced cutouts 424 are defined in a longitudinal free edge of the fixing flange 422.

Figure 6:
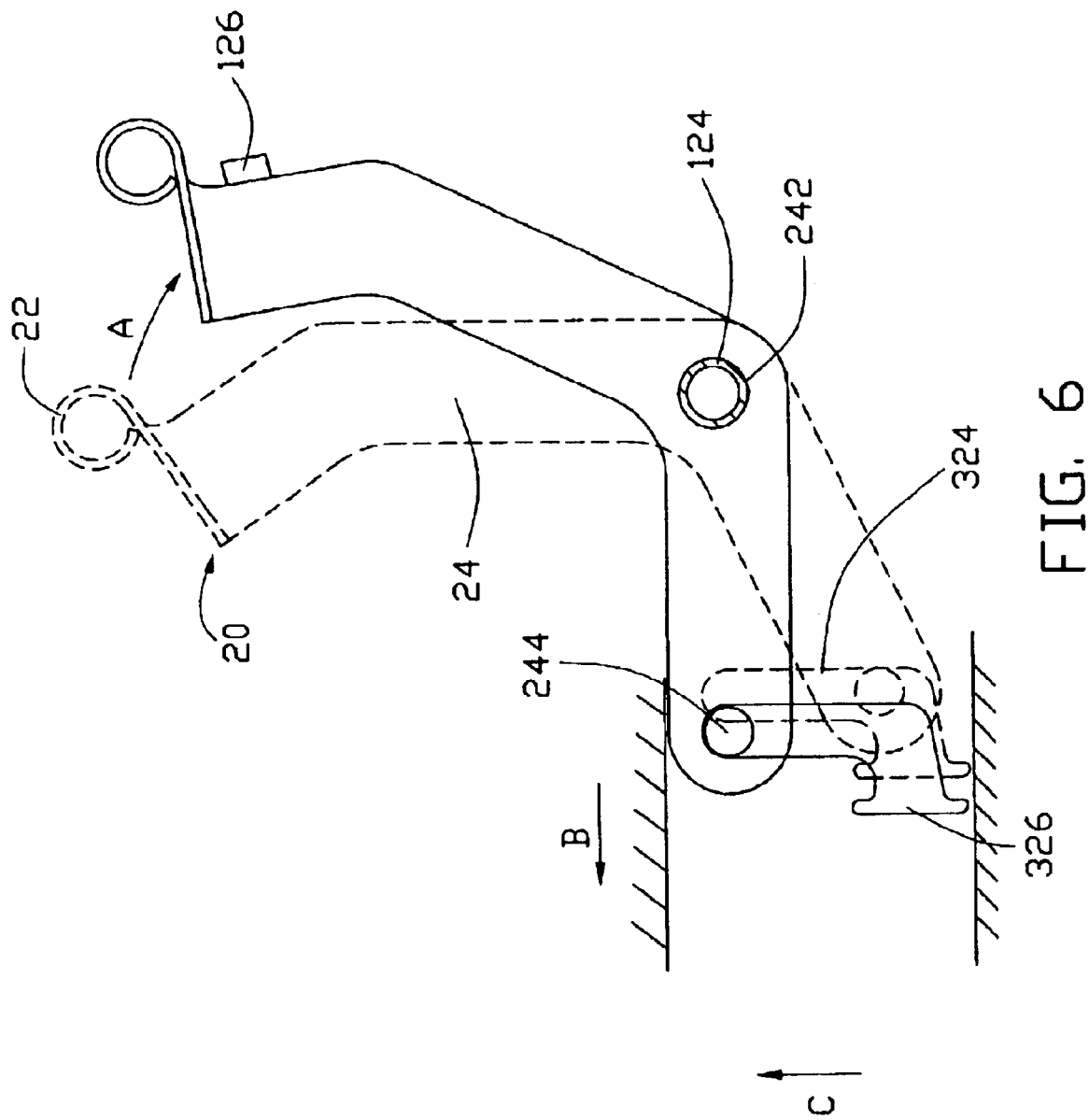
FIG. 6 is an enlarged schematic side plan view of a crank and part of a second bracket of the mounting apparatus of FIG. 1, showing positions of various components at said two stages in the process of attaching the mounting apparatus of FIG. 1 to the computer enclosure.

In assembly, the crank 20 is pivotably attached to the mounting wall 12 of the first bracket 10. The pivot 124 of the first bracket 10 is pivotably received in the pivot hole 242 of the crank 20. The handle 22 of the crank 20 is located beyond and perpendicular to the mounting wall 12. Then the second bracket 30 is placed on part of the supporting plate 128 of the mounting wall 12, with the top wall 32 of the second bracket 30 facing the mounting wall 12. The protrusion 244 of the crank 20 is extended through the entrance 326 of the sliding slot 324 of the second bracket 30. The guiding portion 121 of the first bracket 10 is received in the guiding slot 3211 of the second bracket 30. The handle 22 of the crank 20 is then pushed in direction A (see FIG. 6) toward the blocking tab 126 of the mounting wall 12. The crank 20 is rotated about the pivot 124, and the protrusion 244 accordingly rotates about the pivot 124. The protrusion 244 is horizontally translocated in direction B (see FIG. 6), and perpendicularly translocated in direction C (see FIG. 6). The guiding portion 121 slides along the guiding slot 3211, and keeps the second bracket 30 moving in a horizontal direction. The protrusion 244 pushes the second bracket 30 in direction B, and the protrusion 244 itself slides along the sliding slot 324 in direction C. The crank 20 is thus rotated until the body 24 reaches an inmost end of the L-shaped blocking tab 126. During the course of the crank 20 rotating, the engaging means 322 of the second bracket 30 enter the corresponding locking slots 1221 of the mounting wall 12 until the fasteners 323 of the engaging means 322 are engagingly received in the corresponding narrow portions 1222 of the locking slots 1221. Simultaneously, the positioning posts 342 of the second bracket 30 are engagingly received in the cutouts 424 of the enclosure 40.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A mounting apparatus for disk drive devices, comprising:
    a first bracket having a mounting wall with a pivot extending therefrom;
    a crank pivotably attached on the mounting wall, the crank defining a pivot hole pivotably receiving the pivot, the crank having a protrusion extending from an end thereof; and
    a second bracket having a top wall slidably mounted under the mounting wall, the top wall defining a sliding slot slidably receiving the protrusion of the crank, the top wall having at least one engaging means,
    wherein when the crank is rotated about the pivot from a first position to a second position, the protrusion rotates about the pivot and pushes the second bracket to slide relative to the first bracket, thereby causing the at least one engaging means of the second bracket to engage with the first bracket.

2. The mounting apparatus as described in claim 1, wherein the mounting wall of the first bracket forms a guiding portion, and the top wall of the second bracket defines a guiding slot movably receiving the guiding portion.

3. The mounting apparatus as described in claim 1, wherein the mounting wall of the first bracket defines at least one locking slot, and the at least one engaging means comprises at least one fastener engaging in the at least one locking slot when the crank is located at the second position.

4. The mounting apparatus as described in claim 1, wherein a support plate extends from the mounting wall for supporting the second bracket.

5. The mounting apparatus as described in claim 1, wherein the crank has a body and a handle for facilitating operation thereof, the pivot hole is defined in an elbow of the body, and a blocking member is formed on the mounting wall for supporting the body when the crank is located at the second position.

6. The mounting apparatus as described in claim 1, wherein the sliding slot of the second bracket has an entrance, and the protrusion of the crank has a narrowed neck slidably received in the sliding slot via the entrance.

7. A computer enclosure comprising:
    a panel; and
    a mounting apparatus adapted for mounting storage devices in the enclosure,
    the mounting apparatus comprising:
        a first bracket attached in the enclosure, the first bracket having a mounting wall;
        a crank pivotably mounted on the mounting wall; and
        a second bracket mounted under the mounting wall, the second bracket having a top wall and a bottom wall, and end of the crank being slidably engaged in the top wall,
    wherein when the crank is pivoted from a first position to a second position, the end of the crank pushes the second bracket to slide relative to the first bracket, thereby causing the second bracket to attach to the panel.

8. The computer enclosure as described in claim 7, wherein the mounting wall has a pivot extending therefrom, and the crank defines a pivot hole pivotably receiving the pivot.

9. The computer enclosure as described in claim 7, wherein the crank has a protrusion extending from an end thereof, and the top wall of the second bracket defines a sliding slot slidably receiving the protrusion of the crank.

10. The computer enclosure as described in claim 7, wherein the top wall of the second bracket has at least one fastener, the mounting wall of the first bracket defines at least one locking slot, and the at least one fastener engages in the at least one locking slot when the crank is located at the second position.

11. The computer enclosure as described in claim 7, wherein the mounting wall of the first bracket forms a guiding portion, and the top wall of the second bracket defines a guiding slot movably receiving the guiding portion.

12. The computer enclosure as described in claim 7, wherein a support plate extends from the mounting wall for supporting the second bracket.

13. The computer enclosure as described in claim 8, wherein the crank has a body and a handle for facilitating operation thereof, the pivot hole is defined in an elbow of the body, and a blocking member is formed on the mounting wall for supporting the body when the crank is located at the second position.

14. The computer enclosure as described in claim 9, wherein the sliding slot of the second bracket has an entrance, and the protrusion of the crank has a narrowed neck slidably received in the sliding slot via the entrance.

15. The computer enclosure as described in claim 7, wherein the panel has a fixing flange bent inwardly therefrom, two cutouts are defined in a free edge of the fixing flange, a pair of positioning posts extends from the bottom wall of the second bracket, and the positioning posts are engagingly received in the cutouts when the crank is located at the second position.

16. A computer enclosure comprising:

a panel defining a opening frame thereof;

a first bracket secured on an inner side of the panel and including a mounting wall with a pivotal crank and a plurality of locking devices thereof; and a second bracket positioned under the first bracket and including a wall with thereof engaging devices and a sliding slot receiving an end of said pivotal crank therein; wherein on rotation of the pivotal crank, and second bracket moves toward the panel so as to have the engaging devices engaged with the locking device to lock the first bracket and the second bracket, and have a front end of the second bracket engaged with the opening frame to lock the second bracket and the panel.

* * * * *